United States Patent [19]

Munroe

[11] Patent Number: 5,083,011
[45] Date of Patent: Jan. 21, 1992

[54] AIR HEATER WITH SAFETY CONTROL CIRCUIT

[75] Inventor: Richard W. Munroe, Millbury, Mass.

[73] Assignee: Coppus Engineering Corporation, Millbury, Mass.

[21] Appl. No.: 618,486

[22] Filed: Nov. 27, 1990

[51] Int. Cl.⁵ .............................................. H05B 1/02
[52] U.S. Cl. .................... 219/496; 219/497; 219/491; 219/494; 392/360; 392/365
[58] Field of Search ............ 219/490, 491, 494, 496, 219/508, 497; 392/360, 365, 379

[56] References Cited

U.S. PATENT DOCUMENTS

| | | | |
|---|---|---|---|
| 3,029,332 | 4/1962 | Cotts | 219/496 |
| 3,235,708 | 2/1966 | Kirk | 219/496 |
| 4,185,187 | 1/1980 | Rogers | 219/496 |
| 4,211,251 | 7/1980 | Rickert et al. | 219/521 |
| 4,954,693 | 9/1990 | Mitsuhashi et al. | 219/496 |

*Primary Examiner*—Mark H. Paschall
*Attorney, Agent, or Firm*—Samuels, Gauthier & Stevens

[57] ABSTRACT

An air heater with a safety control circuit is disclosed. A heat source is mounted within a hollow housing having an air inlet end and an air outlet end. The heat source is actuated in response to the presence of a heat control signal. The heat control signal is produced when both a predetermined minimum pressure differential between static air pressure outside the hollow housing and the air velocity pressure within the housing is reached and the temperature of a portion of the housing is lower than a predetermined maximum sensed temperature. Application of the heat control signal to the heat source can be manually initiated or interrupted.

3 Claims, 2 Drawing Sheets

AIR HEATER WITH SAFETY CONTROL CIRCUIT

BACKGROUND OF INVENTION

The present invention relates to heaters in general and, more particularly, to an air heater with safety controls.

Various types of fixed, mobile and portable heaters are known in the art. For example see U.S. Pat. Nos. 2,966,347; 2,972,208; 3,050,111; 3,160,401; 3,211,439; 3,418,452; 3,624,350; 4,053,732; and French Patent No. 916.111.

Use of the prior art heaters presents problems from a safety standpoint. For example, if air flow through the heater is reduced or terminated, dangerous overheating can occur. Similarly, even if air flow continues through the heater the heater itself may become too hot.

It is accordingly a general object of the present invention to provide an air heater with safety controls.

It is a specific object of the invention to provide an air heater that senses a differential pressure between static air pressure and the air velocity pressure within the heater housing.

It is an other object of invention to provide an air heater which senses the temperature of a portion of the heater housing.

It is a still further object of the present invention to provide for shut down of the heat source within the heater housing in the event that the differential pressure between static air pressure outside the heater housing and the air velocity pressure within the housing drops below a predetermined minimum pressure differential.

It is a still further object of the invention to provide for shut down of the heat source in the event that the temperature of a portion of the housing exceeds a preset temperature.

It is a feature of the invention that the safety controls can be implemented utilizing conventional components including electro-mechanical components.

It is another feature of the invention that the safety controls can be implemented so that a manual "restart" is required in the event that the heat source is shut down in response to the above mentioned pressure and/or temperature failure conditions.

BRIEF SUMMARY OF THE INVENTION

An air heater has a heat source mounted within a hollow housing having an air inlet end and an air outlet end. The heat source is actuated in response to the presence of a heat control signal. A safety control circuit produces a heat control signal when both a predetermined minimum pressure differential between static air pressure outside the hollow housing and the air velocity pressure within the housing is reached and the temperature of a portion of the housing is lower than a predetermined maximum sensed temperature. The heat control signal is applied to the heat source through a manually actuated "START" switch. Application of the heat control signal can be interrupted manually by a "STOP" switch or automatically either by the pressure differential falling below the predetermined minimum or by an over temperature condition.

BRIEF DESCRIPTION OF THE DRAWINGS

The objects and features set forth above will best be understood from a detailed description of a preferred embodiment of the invention, selected for purposes of illustration, and shown in the accompanying drawings, in which.

DETAIL DESCRIPTION OF A PREFERRED EMBODIMENT

Figure 1:
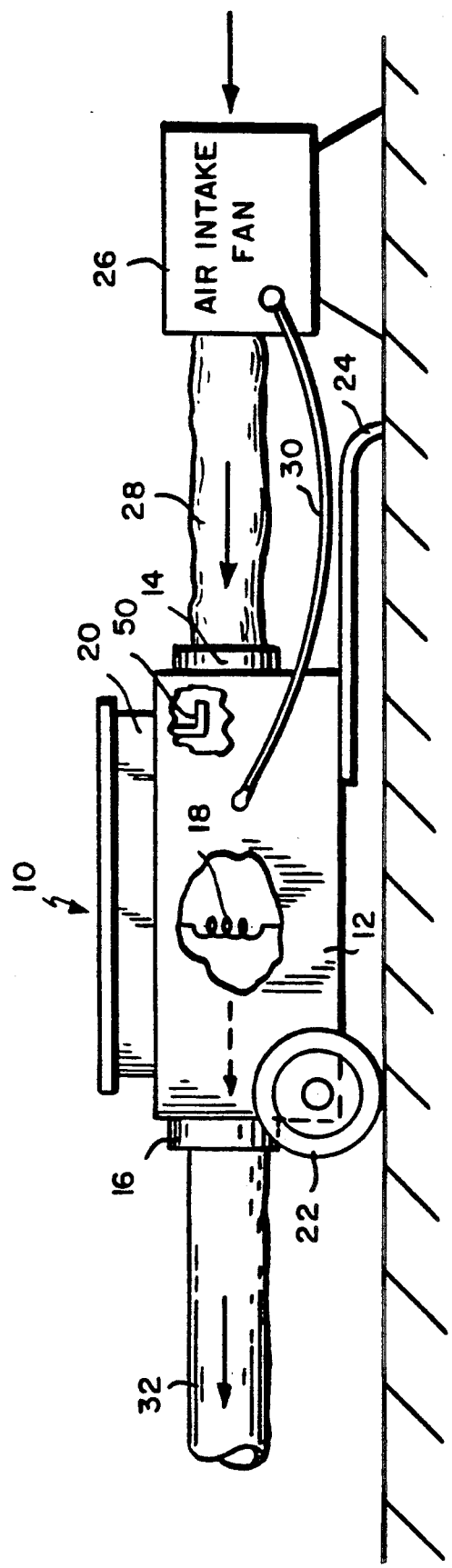
FIG. 1 is a diagrammatic view in side elevation showing a portable air heater connected to an air intake fan through a flexible intake duct.

Referring now to FIG. 1 there is shown in side elevation and partial broken away an air heater indicated generally by the reference 10. The air heater comprises a generally cylindrical, hollow housing 12 having an air inlet end 14, and air outlet end 16, at least one electrically powered resistance heater coil 18 and a control box 20 that contains various electrical power components and control elements that will be discussed more fully in connection with FIG. 2. Preferably, the air heater 10 is configured for portability by means wheels 22 and a pull handle 24.

Air is supplied to the air inlet end 14 of the heater housing 12 from a electrically powered intake fan 26 through a flexible intake duct 28. Electrical power for the air intake fan 26 is furnished through a power cable 30 from the air heater 10 as will be described in connection with FIG. 2. If desired, the air outlet end 16 of the air heater 10 can be coupled to a flexible discharge duct 32.

Figure 2:
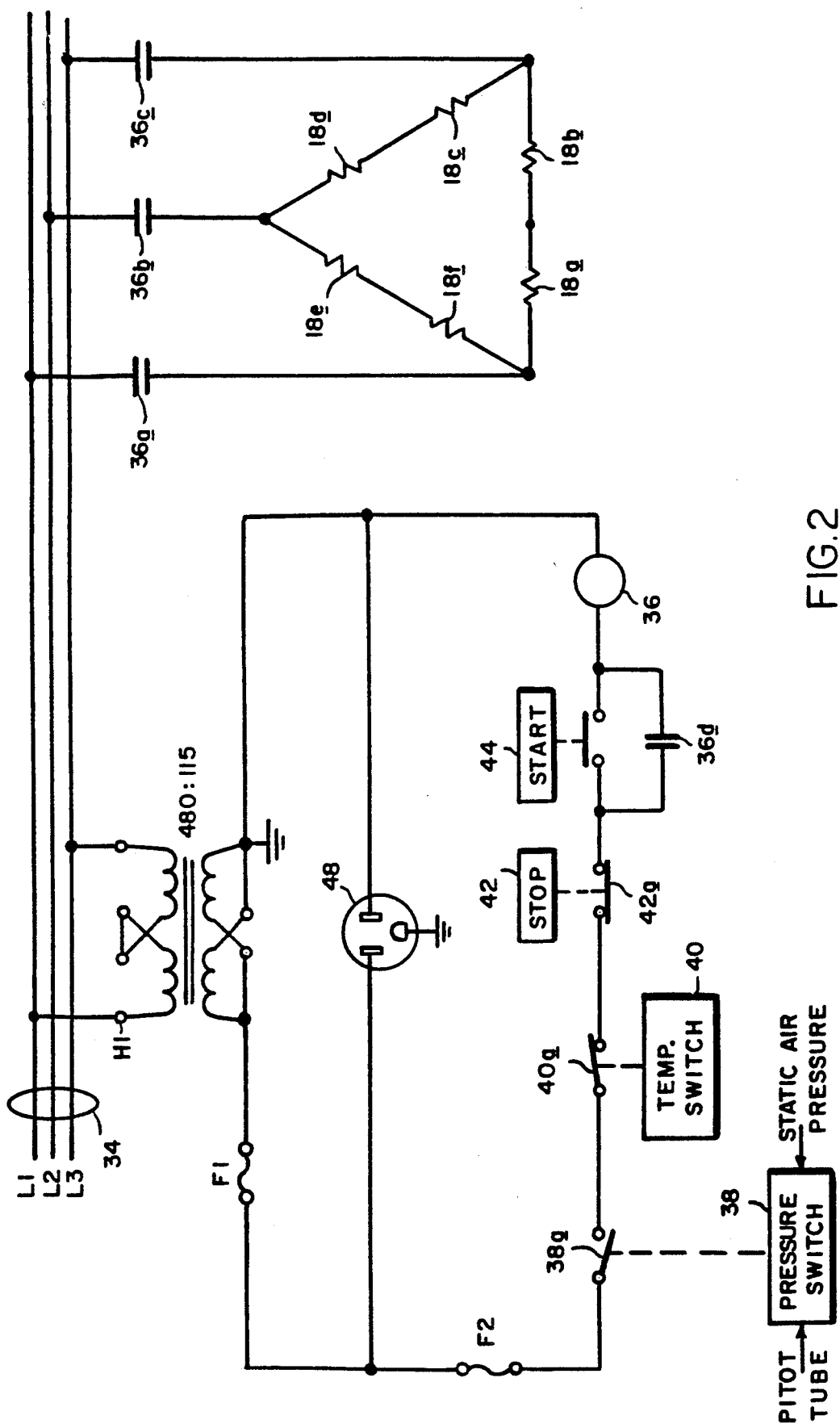
FIG. 2 is a partial schematic and block diagram of the electrical components of the portable air heater and the safety control circuit thereof.

Referring now to FIG. 2, electrical power is obtained from a source such as, a three phase power main, indicated as L1, L2, L3, and collectively identified by the reference 34. The electrical power is applied to the previously mentioned heater coil(s) 18 which are shown for purposes of illustration in FIG. 2 as six, 240 volt heaters 18a–18f connected in a delta configuration and wired for 480 volt operation. It will be appreciated that the number and specific configuration of the resistance heaters 18 can be varied to accommodate different BTU heat output requirements and electrical power source conditions such as a 230 volt three phase service.

Application of the electrical power to the resistance heaters 18a–18f is controlled by the energization of a relay 36 having relay contacts 36a, 36b, and 36c. Energization of relay 36 is controlled by a safety circuit comprising in series a pressure differential actuated switch 38 having switch contacts 38a, a temperature sensing switch 40 having switch contacts 40a, a normally closed STOP switch 42 having switch contacts 42a and a normally open START switch 44 having electrical contacts 44a.

Electrical power for the safety control circuit is obtained from electrical source 34 through a step down transformer 46 which provides 115 volt single phase power for the safety circuit and for an electrical receptacle 48. Electrical receptacle 48 supplies electrical power to the air intake fan 26 (shown in FIG. 1) through the power cable 30. For safety reasons, operation of the air intake fan is independent of the operation of the resistance heaters 18a–18b. Thus, as long as the power cable is connected to the electrical receptacle and, the air intake fan 26 is on, the fan will supply an air flow to the air inlet end 14 of the heater housing.

The 115 volt single phase power from step down transformer 46 also powers relay 36 that controls the application of electrical power to the resistance heaters 18a–18f. The previously mentioned safety circuit is connected in electrical series with relay 36. A pressure switch 38 senses the differential pressure between static air pressure outside of the heater housing and the air velocity pressure of air flowing through the hollow housing of the heater. The air velocity pressure is applied to pressure switch 38 by means of a pivot tube 50 (shown in FIG. 1) located in the housing at the air inlet end thereof. The pressure switch 38 is a conventional switch such as, the air switch Type 770-1 manufactured by the White-Rogers division of Emerson Electric Company, 9797 Reavis Road, St. Louis, Mo.

The pressure switch 38 closes its switch contacts 38a when a predetermined pressure differential exists between the outside static air pressure and the air velocity pressure within the hollow heater housing sensed by the pivot tube 50. In other words, switch 38 closes only when there is sufficient air flow through the heater to prevent overheating. The temperature switch 40 is a conventional switch with normally closed contacts 40a that open at a preset temperature. The temperature switch 40 is mounted on the air heater housing to sense overheating a portion of the housing.

Continuing serially along the safety circuit of FIG. 2, a normally closed, manually actuated "stop" switch 42 is connected in series with a normally open, manually actuated "start" switch 44 which in turn is connected to relay 36.

It will be appreciated from the preceding discussion of the air pressure switch 38, temperature switch 40, "stop" switch 42 and "start" switch 44 that operation of the "start" switch will energize relay 36 only if both the air pressure switch 38 and temperature switch 40 are closed. In the case of the pressure switch, the closed condition of the switch indicates that there is sufficient air flow through the heater housing while the closed condition of the temperature switch 40 indicates that the temperature of a portion of the housing is less than a preset maximum temperature.

When the "start" switch 44 is closed, relay 36 energizes thereby closing the power supply relay contacts 36a, 36b, and 36c to provide electrical power to the electrical resistance heaters 18a-18f. At the same time, a relay holding path is established through relay contact 36d so that when the "start" switch is released, the relay 36 will remain in an energized condition.

The electrical power to the resistance heaters 18a-18f is removed in the event that either the air flow through the housing is reduced so that there is insufficient air flow to establish the predetermined differential pressure sensed by pressure switch 38 or the temperature on the portion of the housing sensed by temperature switch 40 exceeds the preset temperature limit of the temperature switch. In either event, the energization circuit to relay 36 is interrupted causing the relay to drop out. Manual de-energization of the resistance heaters 18a-18f can be accomplished by breaking the energization circuit to relay 36 by actuating the normally closed "stop" switch 42.

With this arrangement, it will be appreciated that if the temperature switch 40 opens as a result of too high a temperature condition, the electrical resistance heaters 18a-18f will be de-energized while the air intake fan 26 continues to operate and supply an air flow through the heater housing to cool the housing. In the event that the air intake fan fails or the air flow through heater housing becomes insufficient, the differential pressure switch 38 will open its contacts 38a thereby interrupting the energization circuit to relay 36.

Given the serial circuit configuration of the pressure switch 38, temperature switch 40, "stop" switch 42 and "start" switch 44, the condition or conditions that opened pressure switch 38 and/or temperature switch 40 must be corrected before the heater can be started manually by pressing "start" switch 44. Under some circumstances it may be desirable to have an automatic startup after an initial manual actuation of the "start" switch and after the under pressure or over temperature conditions have been corrected. In such a case, the manual "start" switch 44 can be provided with a latching mechanism.

Although the preceding description has been directed to an air heater having electrically powered resistance heaters, it will be appreciated that the safety circuit can be applied to other heater heat sources such as, a gas flame heater. In this case, the safety circuit controls the igniter and solenoid actuated supply valve of the gas burner.

Having described in detail a preferred embodiment of the invention it will know be obvious to those skilled in the art that numerous modifications can be made therein without departing for the scope of the invention as defined in the following claims.

What I claim is:

1. An air heater comprising:
   A. a hollow housing having an air inlet end and an air outlet end so as to allow air to flow therethrough;
   B. means mounted within said hollow housing for generating heat in response to the presence of a heat control signal in order to heat the air flowing through said hollow housing;
   C. means for sensing static air pressure exterior of said hollow housing and the velocity pressure of air flowing through said hollow housing;
   D. means for sensing the temperature of a portion of said hollow housing;
   E. means responsive to both:
      (i) a predetermined minimum sensed pressure differential between said static air pressure and said air velocity pressure; and
      (ii) any temperature lower than a predetermined maximum sensed temperature of the portion of said hollow housing;
      for producing said heat control signal; and
   F. means for applying said heat control signal to said heat generating means.

2. An air heater comprising:
   A. a hollow housing having an air inlet end and an air outlet end so as to allow air to flow therethrough;
   B. electrically powered resistance heater means mounted within said hollow housing for generating heat in response to the presence of an electrical heat control signal in order to heat the air flowing through said hollow housing;
   C. means for applying the electrical heat control signal to said electrically powered resistance heater means, said electrical heat control signal applying means having connected in electrical series
      (i) a pressure sensitive electrical switch means for sending static air pressure exterior of said hollow housing and the velocity pressure of air flowing through said hollow housing, said pressure sensitive electrical switch means being closed at or above a predetermined minimum sensed pressure differential between said static air pressure and said air velocity pressure; and (ii) a temperature sensitive electrical switch means for sending the temperature of a portion of said hollow housing, said temperature sensitive switch means being closed at any temperature lower than a predetermined maximum sensed temperature of the portion of said hollow housing, whereby said electrical heat control signal is applied to said electrically powered resistance heater means only if said pressure sensitive switch means and said temperature sensitive switch means are both closed.

3. An air heater comprising:

A. a hollow housing having an air inlet end and an air outlet end so as to allow air to flow therethrough;

B. electrically powered resistance heater means mounted within said hollow housing for generating heat in response to the presence of an electrical heat control signal in order to heat the air flowing through said hollow housing;

C. means for applying the electrical heat control signal to said electrically powered resistance heater means, said electrical heat control signal applying means having connected in electrical series (i) a pressure sensitive electrical switch means for sensing static air pressure exterior of said hollow housing and the velocity pressure of air flowing through said hollow housing, said pressure sensitive electrical switch means being closed at or above a predetermined minimum sensed pressure differential between said static air pressure and said air velocity pressure;

(ii) a temperature sensitive electrical switch means for sensing the temperature of a portion of said hollow housing, said temperature sensitive switch means being closed at any temperature lower than a predetermined maximum sensed temperature of the portion of said hollow housing;

(iii) a normally open, manually actuated "START" switch means; and (iv) a normally closed, manually actuated "STOP" switch means, whereby said electrical heat control signal is applied to said electrically powered resistance heater means only if said pressure sensitive switch means, said temperature sensitive switch means, said normally open, manually actuated "START" switch means and said normally closed, manually actuated "STOP" switch means are all closed.

* * * * *